May 9, 1939.  C. C. HERSKIND  2,157,897
ELECTRIC VALVE CONVERTING SYSTEM
Filed July 1, 1938
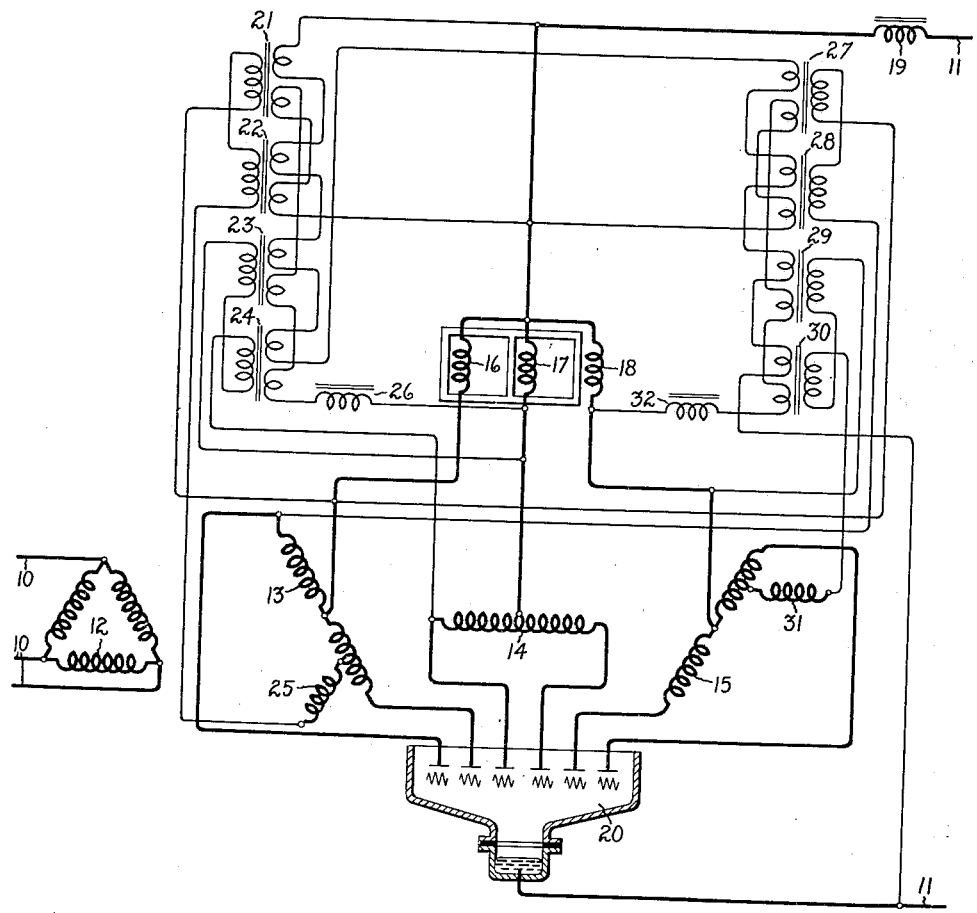
Inventor:
Carl C. Herskind,
by Harry E. Dunham
His Attorney.

Patented May 9, 1939

2,157,897

UNITED STATES PATENT OFFICE 2,157,897

ELECTRIC VALVE CONVERTING SYSTEM

Carl C. Herskind, Schenectady, N. Y., assignor to General Electric Company, a corporation of New York Application July 1, 1938, Serial No. 217,092

5 Claims. (Cl. 175—363)

My invention relates to electric valve converting systems and more particularly to such systems for supplying energy from an alternating current circuit to a direct current circuit.

In electric valve converting and rectifying systems it has been common to use a plurality of phase networks, the mid or neutral points of which were interconnected by means of inductive windings which have also been called interphase transformers. Such inductive windings in the instance of rectifying systems have a voltage which is a function of the load on the rectifier at light load, and which approaches a substantially constant value at heavy load. The voltage of such inductive windings is primarily that of a third harmonic and if some means were provided for supplying to said inductive windings a magnetizing current at light load values on the rectifying system there would be obtained better regulation of the load characteristics of the system. Heretofore there have been provided means for supplying excitation to such inductive windings or interphase transformers but they have had the disadvantage of requiring an additional winding thereon. In accordance with my invention I provide means for supplying excitation current to some of the interphase transformers interconnecting a plurality of phase networks by supplying to them phase displaced higher frequency potentials.

It is therefore an object of my invention to provide an improved electric valve converting system for transferring energy from an alternating current circuit to a direct current circuit.

Another object of my invention is to provide an improved electric valve rectifying system wherein the inductive windings or interphase transformers may be readily supplied with the necessary magnetization current.

For a better understanding of my invention, together with other and further objects thereof, reference is had to the following description taken in connection with the accompanying drawing in which the single figure diagrammatically illustrates my invention as applied to a system for transmitting energy from a three-phase alternating current supply circuit to a direct current load circuit.

In the drawing there is disclosed an alternating current supply circuit 10 and a direct current circuit 11 which is interconnected by an electric valve converting means which includes a polyphase primary winding 12 and a plurality of polyphase networks 13, 14 and 15. Each of the secondary polyphase networks 13, 14 and 15 is provided with a neutral point and these neutral points are connected by means of inductive windings 16, 17 and 18 all arranged on a common magnetic core structure through a suitable smoothing reactor 19 to one side of the direct current circuit 11. The outer extremities of the polyphase networks 13, 14 and 15 are each connected to the other side of the direct current circuit by one of a plurality of arc discharge paths which may comprise a multi-anode single cathode device 20 which may, if desired, be provided with a plurality of control electrodes. While the plurality of arc discharge paths comprising the electric valve means 20 has been shown as being of the single cathode multi-anode type it will, of course, be understood that individual arc discharge paths may be utilized including any of the devices commonly in use in the art, but it is preferable to utilize electric valves of the type having an anode and a cathode enclosed within an ionizable medium and which may, if desired, be provided with a control electrode. The inductive windings 16, 17 and 18 interconnecting the neutral points of the various polyphase networks 13, 14 and 15 are often called interphase transformers and it is known that a voltage is developed across these inductive windings which is a function of the load on the rectifier at light load values and which approaches a substantially constant value at the heavier load values of the rectifier.

In order that a better regulation of the load characteristics of the system may be obtained there is provided a circuit arrangement for reducing the effect of the interphase transformers at light load values of the rectifier and this includes a pair of static frequency doubling means. One of such static frequency doubling means may comprise a plurality of transformers 21, 22, 23 and 24 each of which is provided with an input winding, an output winding, and a direct current saturating winding. The primary or input windings of the transformers 21 and 22 are connected in series so as to be energized from a portion of a polyphase network 13 from the neutral point thereof to the outer extremity of the auxiliary portion 25 of that winding. The primary windings of the transformers 23 and 24 are connected in series so as to be energized from across the lefthand portion of the inductive polyphase network 14. The output windings of all of the transformers 21 to 24 are connected in series so as to energize the inductive winding 17 through a smoothing reactor 26. A second frequency doubling apparatus includes a plurality of transformers 27 to 30 each provided with a primary winding, a direct current saturating winding and an output winding. The primary windings of the transformers 27 and 28 are connected in series so as to be energized from across the upper half of the polyphase network 13. The primary windings of the transformers 29 and 30 are connected in series so as to be energized across a portion of the polyphase network 15 from the neutral point to the outer extremity of the auxiliary winding 31 which forms a portion of this polyphase network. The output windings of all of the transformers 27 to 30 are connected in series so as to energize the inductive winding 18 through a suitable smoothing reactor 32. The smoothing reactors 26 and 32 operate to make the alternating current of the frequency doubling means more sinusoidal in shape. All of the direct current saturating windings of the transformers 21 to 24 and 27 to 30 of both frequency doubling means are connected in series and energized from across the direct current circuit 11. The direct current saturating windings provide the proper flux relations in the cores of these transformers so that the desired harmonic components are produced in the transformer windings. The alternating currents supplying the input circuits of each of the frequency doubling means are displaced from each other by 60 degrees, and the alternating current input of the two frequency doubling means have such a phase relation that the output alternating current of the two frequency doubling means are 120 degrees displaced from each other and have a frequency twice that of the alternating current supply circuit 10.

Since the operation of electric valve converting systems of this type is so well known by those skilled in the art, it is believed sufficient to state that the various arc discharge paths of the valve means 20 are rendered conductive in proper sequence due to the voltages appearing across the various polyphase secondary network windings 13, 14 and 15 so that direct current is supplied to the load circuit 11. The inductive windings or interphase transformers 16, 17 and 18 function in the usual manner under the heavier load conditions on the output circuit of the rectifier, but at lighter load conditions sufficient excitation components are supplied thereto by the frequency doubling means so as to materially reduce the voltage rise which would occur at no load or light load values of the rectifier if no excitation were supplied. From this it will be apparent that the load regulation characteristic is greatly improved by supplying to at least two legs of the three-legged magnetic core structure of the inductive windings or interphase transformers 16, 17 and 18 excitation current having a frequency corresponding to a harmonic of the fundamental supply frequency.

While I have shown and described my invention as applied to a certain specific embodiment it will, of course, be understood that I do not wish to be limited thereto, since it is apparent that the principles herein disclosed are susceptible of numerous other applications, and modifications may be made in the circuit arrangements and in the instrumentalities employed without departing from the spirit and scope of my invention as set forth in the appended claims.

What I claim as new and desire to secure by Letters Patent of the United States, is:

1. In combination, an alternating current supply circuit, a direct current load circuit, an electric valve converting means interconnecting said circuits, said valve means including a plurality of polyphase networks each provided with a neutral point, a plurality of inductive windings interconnecting the neutral points of said networks, said inductive windings having a common magnetic core structure, and a plurality of frequency doubling means energized from different points on said polyphase networks and each arranged to supply excitation current to a different one of said inductive windings.

2. The combination comprising an alternating current supply circuit, a direct current load circuit, an electric valve converting means interconnecting said circuit, said electric valve converting means including three groups of polyphase networks each provided with a neutral point, an inductive winding for each of said neutral points interconnecting said points with one side of said direct current circuit, said inductive windings being mounted on a common magnetic core structure, two static frequency doubling means each energized by two alternating currents having a phase difference of 60 degrees, and means connecting the output of each of said static frequency doubling means to a different one of said last-mentioned inductive windings to supply magnetizing currents thereto.

3. In combination, an alternating current supply circuit, a direct current load circuit, an electric valve converting means interconnecting said circuits, said electric valve converting means including three groups of polyphase networks provided with neutral points, a plurality of inductive windings interconnecting said neutral points, said inductive windings being mounted on a common magnetic core structure, and means for supplying to two of said latter windings alternating current of twice the frequency of said alternating current supply circuit and having a phase relation with respect to each other of 120 degrees, said means comprising two groups of static frequency transformers, each group being energized from different ones of said first-mentioned polyphase networks.

4. In combination, an alternating current supply circuit, a direct current load circuit, an electric valve converting means interconnecting said circuits, said electric valve converting means including a plurality of polyphase networks each provided with a neutral point, a plurality of inductive windings interconnecting said neutral points with said direct current circuit, a plurality of static frequency doubling means each comprising a plurality of transformers having input windings, output windings, and direct current saturating windings, means for supplying to each of said frequency doubling means two alternating currents having a phase displacement with respect to each other and with respect to the alternating current supplied to the other of said frequency doubling means, means connecting said direct current windings to said direct current circuit, and means for connecting the output windings of each of said static frequency doubling means to a different one of said inductive windings.

5. The combination comprising an alternating current supply circuit, a direct current load circuit, an electric valve converting means interconnecting said circuits, said valve means including three groups of polyphase networks each provided with a neutral point, a three-legged magnetic core structure having an inductive winding on each leg thereof, means connecting said inductive windings to the neutral points of said polyphase networks and to said direct current circuit, two static frequency doubling means each energized by two alternating currents having a phase displacement with respect to each other and with respect to the alternating currents of the other of said frequency doubling means, and means connecting the output of each of said frequency doubling means to a different one of said inductive windings thereby to supply magnetizing current to said magnetic core structure.

CARL C. HERSKIND.